(No Model.) 2 Sheets—Sheet 1.

J. FLANNERY.
GAS AND LIQUID HOLDER.

No. 419,845. Patented Jan. 21, 1890.

Witnesses
John Kicker
O. E. Sundgren

Inventor,
Joseph Flannery
by his Attorneys
Brown & Griswold (No Model.) 2 Sheets—Sheet 2.
J. FLANNERY.
GAS AND LIQUID HOLDER.
No. 419,845. Patented Jan. 21, 1890.
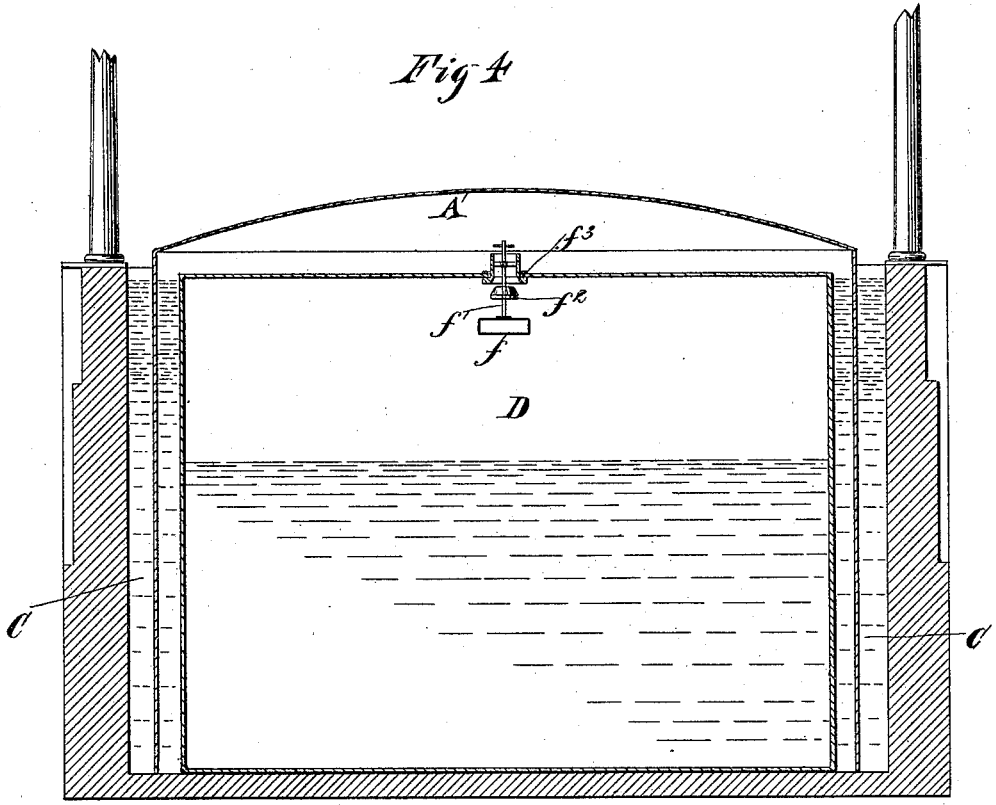

UNITED STATES PATENT OFFICE.

JOSEPH FLANNERY, OF NEW YORK, N. Y.

GAS AND LIQUID HOLDER.

SPECIFICATION forming part of Letters Patent No. 419,845, dated January 21, 1890.

Application filed March 23, 1889. Serial No. 304,502. (No model.)

*To all whom it may concern:*

Be it known that I, JOSEPH FLANNERY, residing at New York, in the county and State of New York, have invented a certain new and useful Improvement in Gas and Liquid Holders, of which the following is a specification.

The object of my improvement is to provide a simple and ready means for storing liquid, and particularly oil to be used in the manufacture of gas; to effect a saving of the gaseous vapors arising from the evaporation of the stored oil and prevent the escape of such vapors in the surrounding atmosphere; to provide means for forcing the liquid stored in the tank, therefore to guard against danger from explosion of the oil, and to effect a saving of ground-space over what has heretofore been possible as such storage-tanks have been erected. To accomplish these results I place a tank for containing the liquid directly within the gas-holder, whereby the tank will be always surrounded by water, by which the gas-holder is sealed, and will therefore be always kept cool and at the same time so inclosed as to be protected against danger from sparks or other causes which might tend to induce an explosion. I further provide the tank with a vent by which the gaseous vapors arising from the evaporation of oil within the tank may pass directly into the gas-holder, thereby not only enriching the gas in the holder and preventing waste, but also providing against the escape of such gaseous vapors into the surrounding atmosphere, as is the common practice, by which the atmosphere is contaminated and the health of a neighborhood endangered. As the tank is in open communication with the gas-holder, in which a heavy pressure is maintained, the weight of the holder and the pressure therein will operate to force oil out of the tank through its delivery-pipe, and raise it to a considerable elevation when it is desired to withdraw the oil, the effect being that of a force-pump. The arrangement of the tank within the holder will not curtail the gas-space of the gas-holder, for the reason that the space occupied by the tank is ordinarily filled with water. By placing the tank within the gas-holder it will be seen also that a considerable saving is effected in the ground-space over what could be effected if the tank and the gas-holder occupied different and separate positions.

Figure 1:
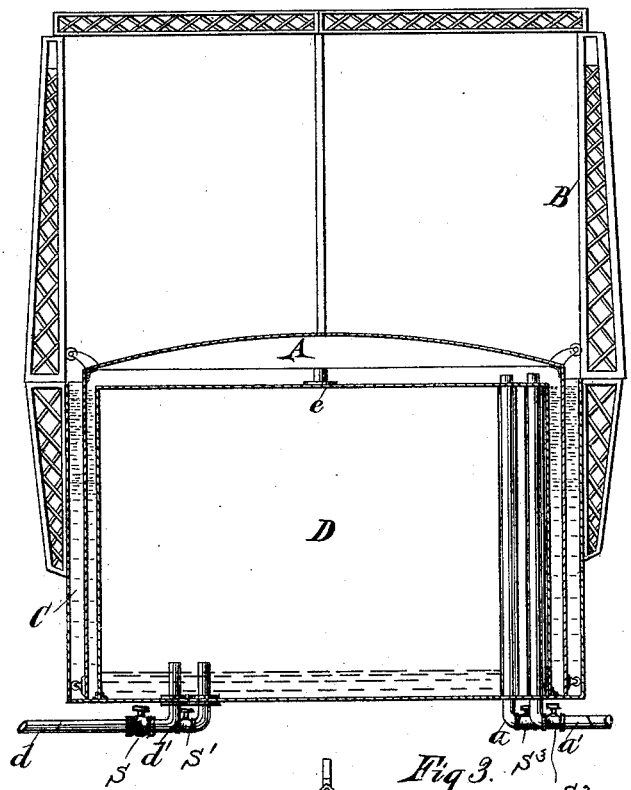
Figure 2:
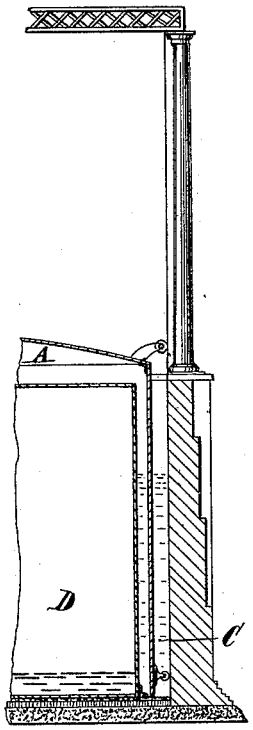
Figure 3:
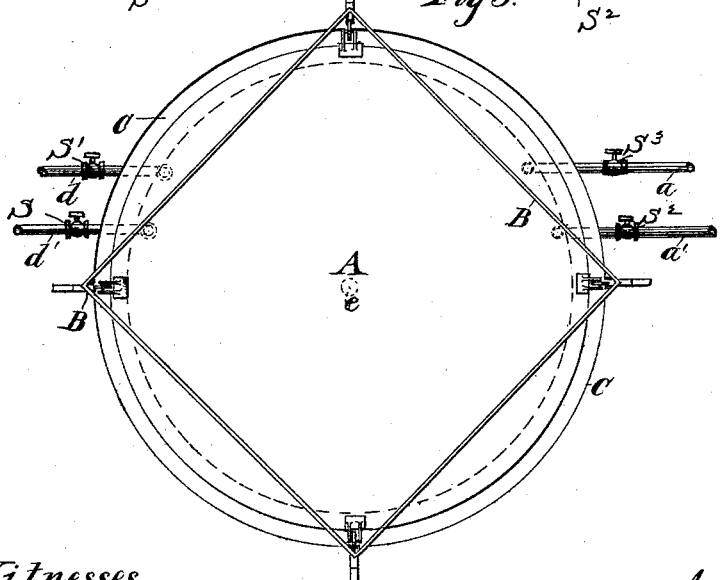

In the accompanying drawings, Figure 1 is an elevation, partly in section, of a gasholder and tank embodying my improvements. Fig. 2 is a similar view, but partly broken away to save space, and illustrating a slightly-modified construction. Fig. 3 is a plan or top view of the improvement shown in Fig. 1. Fig. 4 is a vertical section of the tank and shows a slight modification.

Similar letters of reference designate corresponding parts in all the figures.

A designates the gas-holder, which may be of the usual or any desired construction, adapted to be moved upwardly and downwardly in the frame B.

C designates the well in which the lower portion of the gas-holder is received and in which the water is contained.

$a$ $a'$ designate gas inlet and outlet pipes, respectively, which may be of the ordinary construction and open directly into the gas-holder. They are provided with cocks $s$ $s'$.

D designates a liquid-tank, which tank has, as shown, a closed bottom and top, and is secured at its lower side to the bottom of the well C.

$d$ $d'$ are respectively filling and emptying pipes, by which liquid is delivered to and from the tank D. They are provided with cocks $s^2$ $s^3$.

$e$ designates a vent in the upper portion of the tank, by which means open communication is afforded between the tank and the gasholder.

In Fig. 4 I have shown that a float $f$ may be employed, which float is mounted upon a spindle $f'$, extending upwardly through the vent $e$, and upon which is secured a valve $f^2$, adapted to seat upon a valve-seat $f^3$, formed upon the inner end of the vent $e$ when the liquid in the tank shall have risen to a sufficient height. This will prevent any overflow of oil into the water-space between the tank and the sides of the well when oil is contained in the tank.

In Fig. 1 I have shown the well as made of metal—such as plate-iron—and in Fig. 2 I have shown the same as constructed of masonry. In the latter case the bottom of the well is formed of cement or similar material, and the tank D rests thereon.

Gaseous vapors arising from oil stored in the tank will pass out through the vent $e$ and will become mixed with the gas in the gas-holder, thereby enriching such gas and preventing the waste of said gaseous vapors, besides wholly confining them so that they cannot escape into the surrounding atmosphere.

When it is desired to withdraw oil from the tank, the cock $s^3$ in the filling-pipe $d$ is closed and the cock $s^2$ in the emptying-pipe $d'$ is opened. The weight of the gas-holder and the pressure therein will then operate to force oil out through the emptying-pipe and raise it to a level considerably above the level of the oil in the tank. This is advantageous where the tank and holder are situated at a level below that at which it is desired to use the oil.

Of course instead of using separate pipes for filling and emptying the tank, both operations might be performed through a single pipe.

What I claim as my invention, and desire to secure by Letters Patent, is—

The combination, with a gas-holder, of a tank for liquid arranged in said gas-holder, pipes by which gas is admitted directly into and withdrawn directly from said gas-holder, a vent in the tank by which open communication is afforded between the tank and the gas-holder, and a pipe or pipes communicating with the tank by which liquid may be introduced into and withdrawn from the tank, substantially as and for the purpose specified.

JOSEPH FLANNERY.

Witnesses:
FREDK. HAYNES,
ARTHUR H. GAMBLIN.